Jan. 8, 1929. 1,698,616
R. C. WOODHAM
SAFETY AND SERVICE VALVE
Filed April 14, 1927 2 Sheets-Sheet 1
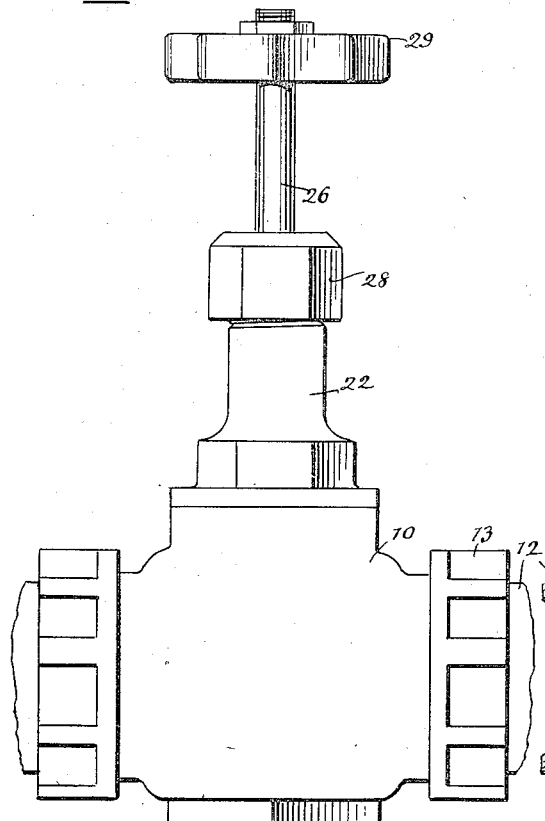
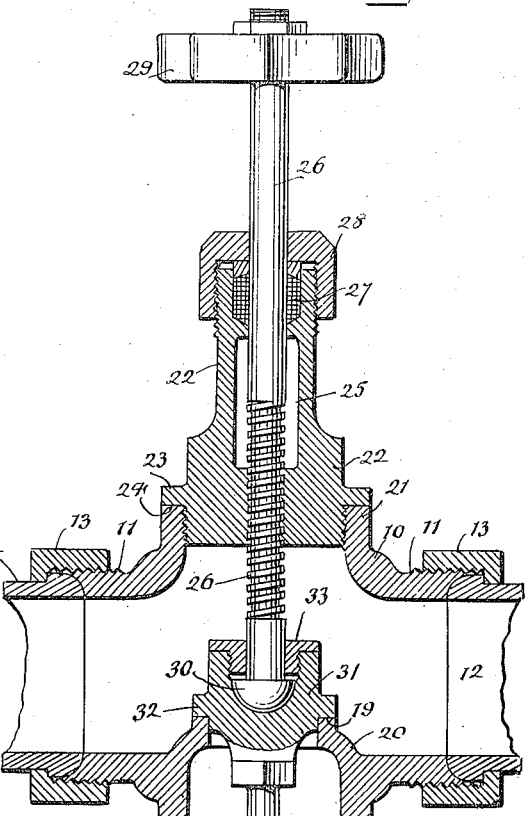
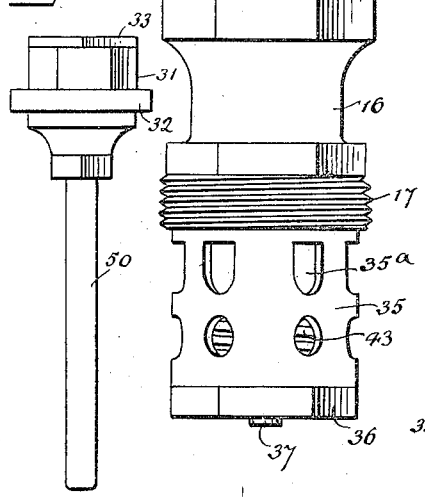
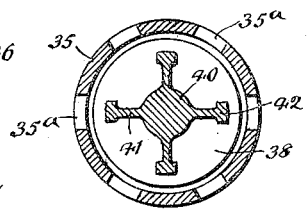
INVENTOR
R. C. Woodham

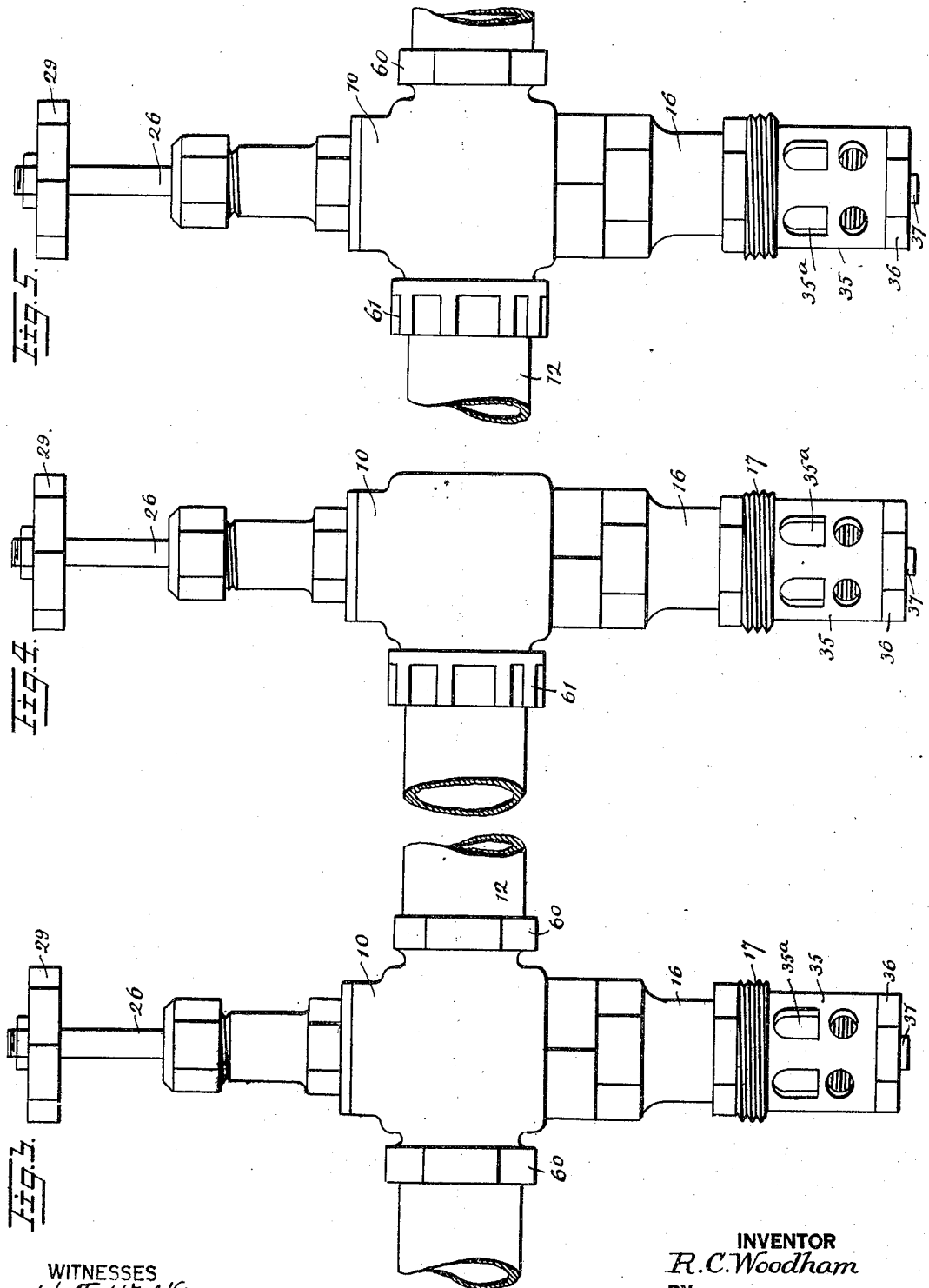

Patented Jan. 8, 1929.

1,698,616

UNITED STATES PATENT OFFICE.

RAYBON CLIFTON WOODHAM, OF MONTGOMERY, ALABAMA.

SAFETY AND SERVICE VALVE.

Application filed April 14, 1927. Serial No. 183,792.

The present invention is concerned with the provision of a safety valve adapted to be introduced into a boiler opening, and equipped with automatically acting safety means for preventing the escape of steam in the event that the main valve or its casting becomes accidentally broken. The valve is adapted for use in connection with all types of steam apparatus, but as a safety device may prove particularly efficacious in connection with steam locomotives.

There have been numerous instances of accidents where locomotive engineers and firemen have been trapped in the cab of an overturned engine, and might have been rescued, save for the fact that the steam valve became broken, and the trapped men were scalded to death. In accordance with the present invention, this danger is greatly minimized since the main valve itself and its associated parts might be completely snapped or broken off in an accident, and the automatically acting safety check valve would prevent the escape of steam.

Another feature of the invention is the provision of a valve in which the main valve may be removed and repaired, and the valve seat ground at any time without cooling down and re-firing the boilers. By virtue of this arangement, a tremendous economy of coal may be effected in various installations, which in accordance with the present practice it is necessary to dump the fires and cool the boilers before service valve repairs can be made.

Other objects of the invention are to provide a steam valve of simple, practical construction, which will be rugged, durable and efficient in use, and well suited to the requirements of economical manufacture and convenient installation.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in side elevation of a valve constructed in accordance with the present innvention.

Fig. 2 is a longitudinal sectional view therethrough.

Fig. 2$^A$ is a transverse sectional detail on the line 2$^A$—2$^A$ of Fig. 2.

Fig. 2$^B$ is a side elevational view of the valve stem extension.

Figs. 3, 4 and 5 are views similar to Fig. 1, but showing the valve attached to different conventional forms of pipe couplings.

In the drawings I have used the reference numeral 10 to designate the body or casting of the valve, this casting being provided with one or more open, externally threaded connections at 11 to which steam pipes 12 may be attached by couplings 13 in any convenient or conventional manner. The body 10 is also provided with a depending apron portion 14 having a threaded connection in a socket 15 of a depending extension 16, the latter having a boss 17 which is externally threaded so that it may be screwed into an opening in a boiler or other receptacle 18.

An annular valve seat 19 is provided by an inwardly and upwardly projecting ring 20 forming part of the casting 10 and disposed at the top of the apron 14. The top of the casting 10 is provided with an upstanding internally threaded ring portion 21 into which the valve bonnet 22 is screwed, this bonnet carrying a flange 23 which rests upon the shoulder 24 at the upper end of the ring 21. The bonnet is preferably hollowed out as at 25 for the sake of lightness and weight, and near its lower end has a threaded connection with a threaded valve stem 26, the upper end of the stem passing through a packing gland 27 held in place in the bonnet by a cap 28.

The valve stem on its outer end is provided with suitable handle means such for instance as the handwheel 29, and at its lower end preferably formed with an approximately semi-spherical head 30 entering a suitably shaped recess 31 in the body of the main valve 32. A collar 33 encircling the lower unthreaded portion of the valve stem 26 screws into the opening 31 permitting only slight play of the head 30 in its socket.

By virtue of the construction described above, rotation of the handwheel 29 will effect lifting of the valve 32 or engagement of the valve with its seat 19.

The present invention is particularly concerned with the provision of some means which will prevent the escape of live steam through the main valve opening, in case the valve stem, bonnet and valve body become crushed or broken in an accident. Such means also permits the valve 32 to be removed, its seat ground, and other associated parts repaired or replaced while there is a full head of stem in the boiler.

With this in view, the extension 17 is continued inwardly into the boiler providing a sleeve portion 35 having radial inlet ports 35ª therein and threaded at its lower end for the reception of a plug 36 which has a central projection 36ª guiding the stem 37 of a check valve 38 adapted to be spring urged upwardly to seat on a downwardly facing seat 39 formed within the sleeve 35. Plug 36 is provided with a hollow boss or extension 36ª which serves as a butting block for the check valve when the latter is in fully opened position.

Valve 38 preferably includes a central spindle portion 40 connected by radial webs 41 to spaced arms 42 which fit within the extension 16 and sleeve 35 and guide the sliding motion of the valve. A coiled expansion spring 43 encircling the stem 37 and interposed between the valve 38 and plug 36 normally tends to seat the valve 38.

Valve 32 however, carries a depending extension 50 in the nature of an operating stem which rests directly upon the spindle 40 and acts to depress the safety check valve 38 against the action of its spring and tending to keep the check valve seated against the projection 36ª. This rod or extension 50 is preferably guided in a spider 51 cast integral with the apron 14 and body 10.

In the ordinary operation of the valve, handle 29 is operated to positively lift the valve 32 off its seat and permit steam to escape from the boiler into the pipes 12, 12. Spring 43 causes the check valve 38 to follow the valve 32 upwardly, movement of the check valve to seated position being controlled at all times by the rod 50.

At times when the valve 32 needs to be repaired, or its seat needs to be reground, or any part of the main valve stem, the bonnet, or the couplings 13 need to be repaired or adjusted, the check valve 38 automatically is spring pressed on to its seat, cutting off escape of steam from the boiler while the main valve or its associated parts are being operated upon.

In case of an accident, which might tend to destroy or break off the main valve or its associated parts, and leave a free passage for the egress of steam from the apron 14, valve 38 moves to closed position. I have thus provided a safety device which not only effects a great economy of coal due to the fact that boilers need no longer be cooled down, while repairing the service valves, but in many instances will prevent loss of life due to accidents where the service valves are broken.

In Figs. 3, 4 and 5 of the drawings I have shown valves embodying the present invention attached to steam pipes through various conventional couplings. In Fig. 3, for instance, I have shown a two-way steam fitting in which the coupling members 60 are of hexagonal shape for the convenient application of a wrench. Fig. 4 shows a one-way fitting attached to a steam pipe by a conventional pipe nipple fitting 61. In Fig. 5 I have shown a valve in which one steam pipe is attached by the use of a coupling such as 60 and the other by a nipple fitting such as 61.

It is to be understood that the particular manner in which the valve is coupled to its associated parts is subject to a wide range of variation, that many conventional types of valves and seats might be substituted for the valve and seat 31, 19; that the handle means 29 illustrated is subject to a wide range of variations. In fact numerous changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A safety and service valve comprising an extension having a boss to be secured in the wall of a receptacle, said boss having a valve seat and a sleeve with a port projecting into the receptacle, a check valve having means by which it is guided within the boss, resilient means tending to move the guide means along the boss and the valve into engagement with the seat, a main valve having means engaging the check valve to ordinarily prevent such engagement, and a valve body connected with the extension at a point remote from the check valve, permitting unrestricted movement of the check valve to the seat-engaging position should the extension be broken off above the boss or the valve body removed from the extension.

2. A safety and service valve comprising a tubular extension having an enlarged boss for connection in the wall of a receptacle, a threaded socket on the exposed end of the extension and a ported sleeve protruding from the boss within the receptacle, a valve seat on the boss within the sleeve, a check valve confronting the seat and having means riding within the boss for guidance, said valve having a spindle at one side and a stem at the other, a spring tending to move the valve into engagement with the seat, a plug closing the end of the sleeve, providing an abutment for the spring and having a central projection guiding the stem, a main valve having means reaching down to the spindle tending to keep the check valve seated against said projection, and a valve body having a seat for the main valve and an apron by which it is connected with the projection at a point remote from the check valve, permitting unrestricted movement of the check valve under certain conditions.

RAYBON CLIFTON WOODHAM.